United States Patent Office 2,861,078
Patented Nov. 18, 1958

2,861,078

PREPARATION OF BENZOTRIAZOLES

Emery B. Miller and George F. Schlaudecker, Toledo, Ohio

No Drawing. Application November 19, 1956
Serial No. 622,767

6 Claims. (Cl. 260—308)

This invention relates to the preparation of benzotriazoles, and, more particularly, to an improved method for the production thereof which yields a sufficiently pure crude reaction mixture that purification with decolorizing carbon is effective, and can be used repeatedly to produce a purified product of any presently desired degree of purity.

Benzotriazoles, and specifically benzotriazole

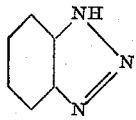

are useful as photographic chemicals, and as anti-tarnish agents in detergents. Benzotriazoles have been produced from orthophenylenediamine and from substituted orthophenylenediamines by diazotization. The reactions which are believed to be involved are represented below:

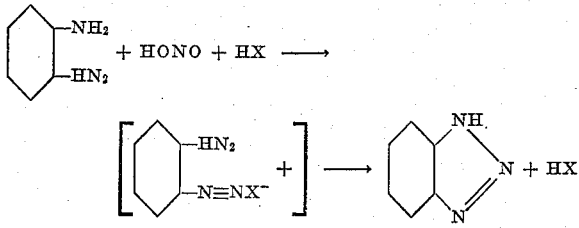

Benzotriazole has been produced by mixing a mineral acid such as hydrochloric acid with a water solution of orthophenylenediamine, and then adding a nitrite salt such as sodium nitrite to the resulting mixture. The hydrochloric acid and sodium nitrite react to form nitrous acid and sodium chloride, and the former then undergoes the above-indicated reaction with the orthophenylenediamine. The crude reaction mixture which results, however, is likely to be highly colored, and, even after color removal, seems to contain reactive ingredients which impart color to it after standing for a relatively short period of time. It has been found that substantial product improvement can be accomplished by adding a mixture of acetic acid and hydrochloric acid to the orthophenylenediamine solution and then adding sodium nitrite to produce the required nitrous acid, together with sodium chloride and sodium acetate. However, the crude reaction mixture prepared even in this manner contains highly reactive ingredients and takes on a substantial color after standing for only a short period of time. Therefore, even by this improved method the crude reaction product must be purified more promptly than is ordinarily possible in commercial operation. It has been found that decolorizing carbon is comparatively ineffective at purifying a crude solution comprising benzotriazole produced in either of the described ways, and that a vacuum distillation is required to isolate a sufficiently pure grade of benzotriazole for use either as an anti-tarnish agent in detergents or as a photographic chemical. It has also been found that, under certain conditions which are not fully understood, explosive reactions may occur during the course of the vacuum distillation. In one instance such an explosion destroyed a major part of the plant in which the distillation was being conducted.

The instant invention is based upon the discovery of an improved method for producing benzotriazole or substituted benzotriazoles, which method results in the production of a sufficiently pure crude reaction mixture that a vacuum distillation is not required. The crude product can be treated with decolorizing carbon, either in one stage or in a plurality of successive stages, to produce benzotriazoles of any degree of purity presently required.

It is, therefore, an object of the invention to provide an improved method for producing benzotriazoles.

It is another object of the invention to provide such an improved method which yields a crude reaction product capable of purification to any presently desired degree of purity by contact with decolorizing carbon.

Other objects and advantages will be apparent from the description which follows, which is intended only to illustrate and disclose, but in no way to limit, the invention.

According to the invention an improved method for producing benzotriazoles is provided. Such method comprises effecting a mixture, in an aqueous system, of a nitrite and orthophenylenediamine or a substituted orthophenylenediamine, and adding, to such mixture, an acid reacting substance selected from the group consisting of aliphatic monobasic acids, $(H_2PO_4)^-$ salts, citric acid, carbonic acid, glycolic acid, and aliphatic dibasic acids such as oxalic acid, malonic acid, succinic acid, and diglycolic acid.

Benzotriazole can be produced in accordance with the method of the invention by diazotizing orthophenylenediamine. Substituted benzotriazoles can also be produced by diazotizing substituted orthophenylenediamines, where the substituent or substituents is or are attached to one of the carbon atoms in the benzene ring. Orthophenylenediamine and such substituted orthophenylenediamines can be represented by the generic formula

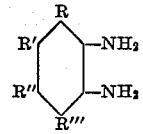

where R, R', R" and R''' can be the same or different, and each is hydrogen, nitro, alkyl, alkoxy, aryl, aroxy, aralkyl, aralkoxy, alkaroxy, halogen, or the like, and two or more of which can be a part of a fused-ring orthophenylenediamine. Examples of such known orthophenylenediamines include orthophenylenediamine, 4-nitro-orthophenylenediamine, 4 - methylorthophenylenediamine, carboxy orthophenylenediamine, carboethoxyorthophenylenediamine, 1,2-naphthalenediamine, 4-bromo-1,2-naphthalenediamine, and orthodiaminoanthraquinone. 4-nitro-orthophenylenediamine has been employed experimentally to produce 5-nitro-benzotriazole. Orthophenylenediamine is a preferred starting material, because unsubstituted benzotriazole, which is produced therefrom by the reaction of the invention, is the benzotriazole which has the greatest commercial significance at the present time. Mono substituted orthophenylenediamines and mono substituted orthophenylenediamines where the substituent is in the four position are also preferred starting materials because the possibility of interference with the desired diazotization by the substituent is minimal in the case of such materials.

In general, any nitrite can be employed in the production of benzotriazoles according to the method of the invention. Metal nitrites constitute a preferred class of reactants and alkali metal nitrites are most preferred because of their availability and water solubility, as well as for economic reasons. Sodium nitrite is presently the most advantageouse source for $NO_2^-$ ions.

It is preferred that the nitrite be employed in the proportion of at least one mole per mole of the orthophenylenediamine or substituted orthophenylenediamine in producing benzotriazoles according to the method of the invention. Most desirably the nitrite is used in a 5 to 10% excess over equimolecular proportions in order to assure the availability of sufficient nitrous acid for completion of the diazotization reaction.

As is indicated above, the diazotization reaction according to the invention is carried out in an aqueous system. The amount of water employed should be sufficient to dissolve the various reactants, but otherwise any desired amount of water can be employed. It is preferred, however, to avoid a large excess of water in order to minimize the volume of reaction mixture which must be handled during diazotization and subsequent processing. The diazotization reaction is exothermic, and gives off sufficient heat that, under some circumstances, the reaction mixture may boil. It has been found that the reaction can be carried out conveniently by using a sufficient amount of water that the heat of reaction does not cause boiling of the reaction mixture. If desired, an amount of water can be used which is sufficient to prevent the exothermic heat from warming the reaction mixture above any given temperature between the initial temperature and the boiling point; however, this is not essential, as the reaction mixture can be cooled in other ways. It has been found to be convenient, in preparing benzotriazole from orthophenylenediamine, to use from about 3 to about 10 parts of water per part of orthophenylenediamine.

The terms "percent" and "parts" are used herein, and in the appended claims, to refer to percent and parts by weight, unless otherwise indicated.

As has been indicated above, benzotriazoles are produced in accordance with the invention by adding one of several specified acid reacting substances to a mixture in an aqueous system comprising orthophenylenediamine or a substituted orthophenylenediamine and a nitrite. The acid reacting substances that have been found to be operable for producing benzotriazoles according to this method are aliphatic monobasic acids, $(H_2PO_4)^-$ salts, citric acid, carbonic acid, glycolic acid, and aliphatic dibasic acids such as oxalic acid, malonic acid, succinic acid, and diglycolic acid. It will be observed that these acid reacting substances can all be classified as weak or moderately strong acids, and specifically as weak or moderately strong acids having a dissociation constant about $10^{-8}$ and about $10^{-1}$, inclusive. It has been found, however, that some acid reacting substances, and specifically some organic acids, which have dissociation constants within the indicated range cannot be used to produce benzotriazoles in accordance with the method of the invention. For example, while citric acid is entirely satisfactory as an acid reacting substance, lactic acid has been found to be notably inferior for such use, relative to citric acid and other satisfactory acids. The reason for such difference in reaction characteristics between lactic acid and citric acid is not understood, particularly in view of the chemical similarity therebetween. Halogen acids, sulfuric acid, benzene sulfonic acid, sodium bisulfate, benzoic acid, boric acid, sodium bisulfite, and maleic acid appear to be completely unsuitable acid-reacting materials. In general, any aliphatic monobasic acid, for example from formic acid through stearic acid, or any aliphatic dibasic acid, for example from oxalic acid through sebacic acid, can be employed, but it is usually preferred, for economic reasons, and also because of their greater water solubility, to use such acids having not more than 6 carbon atoms, i. e., from formic acid through caproic acid, and from oxalic acid through adipic acid. Because of their availability and for economic reasons formic acid, acetic acid and propionic acid are most preferred. The amount of such an acid reacting substance employed in producing benzotriazoles in accordance with the invention should be at least the stoichiometric amount thereof for complete reaction with nitrite used to produce nitrous acid. An excess of acid reacting substance over the stoichiometric amount can also be employed, if desired. The amount of such excess, if used, is not critical and can, for example, be as much as 20 to 30 percent, or even more.

The following examples are presented solely for the purpose of further illustrating and disclosing the invention, and are in no way to be construed as limitations thereon.

EXAMPLE 1

Benzotriazole was produced from orthophenylenediamine, sodium nitrite and acetic acid according to the following procedure:

A solution of 91 grams of sodium nitrite in 500 milliliters of water was placed in a 1-liter beaker equipped with a mechanical stirrer. A charge of 135 grams of orthophenylenediamine was then added to the solution in the beaker, with stirring, which was continued until completion of the procedure. An 83-gram portion of glacial acetic acid was then added to the slurry in the beaker over a period of about 3 minutes. After the acetic acid addition was complete the beaker contained a hot emulsion of wet benzotriazole oil in water at a temperature of about 90° C. This emulsion was allowed to cool to room temperature, and the crystals which formed, principally as the reaction mixture cooled between 45° C. and 35° C., were separated from the mother liquor by filtration, washed with three successive 100-millitliter portions of water, and dried in air. The recovery of dried, crude benzotriazole, melting point about 95° C., amounted to 113 grams. By extracting a portion of the combined mother liquor and wash water with ether, and evaporating the extract to constant weight, it was determined that an additional 31 grams of crude benzotriazole had been dissolved in the mother liquor and washings, so that the total amount thereof produced amounted to 144 grams, or 97% of the theoretical yield.

A 15-gram portion of the crude benzotriazole was then purified according to the following procedure:

The crude benzotriazole was added to a 150-milliliter charge of water contained in a 250-milliliter Erlenmeyer flask, and the resulting mixture was heated to about 100° C., with agitation, to dissolve the benzotriazole. A 1.5-gram portion of powdered activated carbon was then added to the solution in the flask, and the resulting suspension was held at about 100° C. for about 10 minutes, with frequent agitation to keep the carbon suspended. The benzotriazole solution was then separated from the carbon by passing it through a preheated Büchner funnel, and the filtrate was cooled, with mechanical stirring, to 5° C. Benzotriazole which crystallized from the solution was recovered by filtration and dried in air: yield 11.3 grams of purified benzotriazole, extremely pale tan color, melting point 97° C. This purified benzotriazole was of substantially higher purity than is presently required for technical grade material, and specifically was within the specifications established for use thereof as an antitarnish agent with detergents. Repetition of the described purification procedure, however, produced a still lighter colored and purer benzotriazole having a slightly higher melting point. It has been found that this purification procedure can be repeated to produce benzotriazole of any desired higher quality, principally in terms of color improvement.

When, for purposes of comparison, but not in accordance with the invention, the procedure described in the first paragraph of Example 1 was repeated, except that the water, orthophenylenediamine, and acetic acid were first introduced into the beaker, and a water solution of the sodium nitrite was then added thereto, either stepwise or in a single addition, it was found that the "purified" material produced according to the procedure described in the second paragraph of Example 1 was a pinkish-tan color, had a melting point ½° to 1° lower, and was not sufficiently pure for use as technical grade benzotriazole. The recovery from such purification was approximately 75%. Furthermore, repeated purifications did not appreciably improve the pinkish-tan color of the product resulting from such first purification, and is not known to be possible, in this way, to produce benzotriazole sufficiently pure for use as technical grade material. When an equivalent amount of hydrochloric acid was substituted for glacial acetic acid in carrying out the diazotization described in this paragraph, the resulting crude benzotriazole is even darker in color, and can be purified with activated carbon only to an even lower degree of purity. When either of the procedures described in this paragraph is employed, the crude reaction mixture contains components of presently unknown chemical composition, which are not present in a crude reaction mixture produced in accordance with the invention, and which continue to generate colored bodies, thus greatly aggravating the color removal problem.

EXAMPLE 2

The procedure described in the first paragraph of Example 1 was repeated except that a 191-gram portion of 4-nitro-orthophenylenediamine was employed instead of the 135-gram portion of orthophenylenediamine, and that the sodium nitrite was dissolved in 2100 milliliters of water instead of in 500. A crude 5-nitrobenzotriazole was recovered, and was then purified in the manner described in the second paragraph of Example 1 to produce 200.5 grams of purified 5-nitrobenzotriazole, melting point 215° C., color light tan. The yield of purified material was 97.9 percent of theoretical, based on 4-nitro-orthophenylenediamine.

EXAMPLE 3

The procedure described in the first paragraph of Example 1 was repeated except that equivalent amounts of various acid reacting substances other than acetic acid were substituted for the acetic acid. The acid reacting substances used, and the amounts thereof, are presented in the following table, together with the number of grams of purified benzotriazole recovered, the percent yield of purified benzotriazole, and the color and melting point of the purified material.

Table

| Identity | Acid reacting substance, grams | Purified benzotriazole Grams | Yield, percent | Purity Melting point, degree | Color |
|---|---|---|---|---|---|
| Formic acid | [1] 64 | 126 | 84.5 | 96 | Extremely pale tan. |
| Propionic acid | 103 | 120 | 80.8 | 95 | Do. |
| Malonic acid | [2] 72 | 124 | 83.1 | 96 | Very light tan. |
| Succinic acid | 82 | 135 | 90.4 | 97 | Extremely pale tan. |
| Mono sodium phosphate monohydrate | 191 | 112 | 75.3 | 95 | Very light tan. |
| Citric acid | 89 | 133 | 89.3 | 96 | Do. |
| Glycolic acid | [3] 105 | 119 | 79.6 | 96 | Do. |
| Diglycolic acid | [4] 105 | 104 | 70.0 | 96 | Do. |

[1] Added as 88% aqueous solution.
[2] Added as 58% aqueous solution.
[3] Added as 70% aqueous solution.
[4] Added as 50% aqueous solution.

EXAMPLE 4

The procedure described in the first paragraph of Example 1 was also repeated using carbonic acid as the acid reacting substance. In this instance, the orthophenylenediamine and water solution of sodium nitrite were added to an agitated pressure vessel, which was then closed, and carbon dioxide was introduced thereinto until no more was absorbed. The yield of crude benzotriazole, melting point 95° C., was 128 grams, 86%. The color of the crude benzotriazole was about comparable with that achieved in the preceding examples, after purification, so that purification of the crude benzotriazole was not required to produce technical grade material.

It will be apparent that various changes and modifications can be made from the specific details disclosed in the foregoing examples, and discussed in the specification, without departing from the spirit and scope of the attached claims.

What we claim is:

1. A method for producing benzotriazoles which comprises effecting a mixture in an aqueous system of a nitrite and a compound selected from the group consisting or orthophenylenediamine and substituted orthophenylenediamines wherein the substituent is attached to a carbon atom of the benzene ring, and adding thereto at least 1 chemical equivalent of an acid reacting substance having a dissociation constant between about $10^{-8}$ and about $10^{-1}$, which acid reacting substance is selected from the group consisting of citric acid, glycolic acid, diglycolic acid, carbonic acid, acids having the generic formula R—COOH, where R is a member of the group consisting of hydrogen and alkyl radicals having from 1 to 5 carbon atoms, and acids having the generic formula $$HOOC-R^1-COOH$$

where $R^1$ is an n-alkylene radical having from 1 to 8 carbon atoms.

2. A method for producing benzotriazoles which comprises effecting a mixture in an aqueous system in the proportions of at least 1 mole of a metal nitrite and 1 mole of a compound selected from the group consisting of orthophenylenediamine and substituted orthophenylenediamines wherein the substituent is attached to a carbon atom of the benzene ring, and adding thereto at least 1 chemical equivalent of an acid reacting substance having a dissociation constant between about $10^{-8}$ and about $10^{-1}$, which acid reacting substance is selected from the group consisting of citric acid, glycolic acid, diglycolic acid, carbonic acid, acids having the generic formula R—COOH, where R is a member of the group consisting of hydrogen and alkyl radicals having from 1 to 5 carbon atoms, and acids having the generic formula $$HOOC-R^1-COOH$$

where $R^1$ is an n-alkylene radical having from 1 to 8 carbon atoms.

3. A method for producing benzotriazoles which comprises effecting a mixture in an aqueous system in the proportions of at least 1 mole of an alkali metal nitriate and 1 mole of a compound selected from the group consisting of orthophenylenediamine and substituted orthophenylenediamines wherein the substituent is attached to a carbon atom of the benzene ring, and adding thereto at least 1 chemical equivalent of an acid reacting substance having a dissociation constant between about $10^{-8}$ and about $10^{-1}$, which acid reacting substance is selected from the group consisting of citric acid, glycolic acid, diglycolic acid, carbonic acid, acids having the generic formula R—COOH, where R is a member of the group consisting of hydrogen and alkyl radicals having from 1 to 5 carbon atoms, and acids having the generic formula $$HOOC-R^1-COOH$$

where $R^1$ is an n-alkylene radical having from 1 to 8 carbon atoms.

4. A method for producing benzotriazoles which comprises effecting a mixture in an aqueous system in the proportions of at least 1 mole of an alkali metal nitrite and 1 mole of a compound selected from the group consisting of orthophenylenediamine and substituted orthophenylenediamines wherein the substituent is attached to a carbon atom of the benzene ring, adding thereto at least 1 chemical equivalent of an acid reacting substance having a dissociation constant between about $10^{-8}$ and about $10^{-1}$, which acid reacting substance is selected from the group consisting of citric acid, glycolic acid, diglycolic acid, carbonic acid, acids having the generic formula R—COOH, where R is a member of the group consisting of hydrogen and alkyl radicals having from 1 to 5 carbon atoms, and acids having the generic formula

HOOC—R¹—COOH where $R^1$ is an n-alkylene radical having from 1 to 8 carbon atoms, forming a solution comprising the crude benzotriazole, decolorizing the resulting solution, and recovering purified benzotriazole from the decolorized solution.

5. A method for producing benzotriazoles which comprises effecting a mixture in an aqueous system in the proportions of at least 1 mole of an alkali metal nitrite and 1 mole of a compound selected from the group consisting of orthophenylenediamine and substituted orthophenylenediamines wherein the substituent is attached to a carbon atom of the benzene ring, adding thereto at least 1 mole of an acid having the generic formula R—COOH where R is a member of the group consisting of hydrogen and alkyl radicals having from 1 to 5 carbon atoms, separating crude benzotriazole from the resulting reaction mixture, forming a solution comprising the crude benzotriazole, decolorizing the resulting solution, and recovering purified benzotriazole from the decolorized solution.

6. A method for producing benzotriazoles which comprises effecting a mixture in an aqueous system in the proportions of at least 1 mole of an alkali metal nitrite and 1 mole of a compound selected from the group consisting of orthophenylenediamine and substituted orthophenylenediamines wherein the substituent is attached to a carbon atom of the benzene ring, adding thereto at least 1 mole of acetic acid, separating crude benzotriazole from the resulting reaction mixture, forming a solution comprising the crude benzotriazole, decolorizing the resulting solution, and recovering purified benzotriazole from the decolorized solution.

References Cited in the file of this patent
UNITED STATES PATENTS

| | | |
|---|---|---|
| 2,407,204 | English et al. | Sept. 3, 1946 |
| 2,410,619 | Allen et al. | Nov. 5, 1946 |